US 6,557,804 B1

(12) United States Patent
Carroll

(10) Patent No.: US 6,557,804 B1
(45) Date of Patent: May 6, 2003

(54) ROTATING SOLAR CONCENTRATOR

(75) Inventor: Joseph P. Carroll, Moorpark, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/007,403

(22) Filed: Dec. 5, 2001

(51) Int. Cl.[7] ............................................. F03H 5/00
(52) U.S. Cl. ........................ 244/173; 126/685; 126/605
(58) Field of Search ......................... 244/173; 126/685, 126/600

(56) References Cited

U.S. PATENT DOCUMENTS

| 3,868,823 | A |   | 3/1975  | Russell, Jr. et al. |         |
|-----------|---|---|---------|---------------------|---------|
| 4,281,640 | A |   | 8/1981  | Wells               |         |
| 4,408,595 | A |   | 10/1983 | Broyles et al.      |         |
| 4,548,195 | A | * | 10/1985 | Balhorn             | 126/602 |
| 4,572,160 | A |   | 2/1986  | Blikken et al.      |         |
| 4,696,285 | A | * | 9/1987  | Zwach               | 126/604 |
| 5,005,958 | A | * | 4/1991  | Winston et al.      | 359/727 |
| 5,374,317 | A |   | 12/1994 | Lamb et al.         |         |
| 5,531,216 | A | * | 7/1996  | Nicklas et al.      | 126/599 |
| 5,540,216 | A | * | 7/1996  | Rasmusson           | 126/603 |
| 5,592,932 | A |   | 1/1997  | Yeomans             |         |
| 5,655,515 | A | * | 8/1997  | Myles et al.        | 126/601 |
| 6,119,986 | A | * | 9/2000  | Stribling, Jr.      | 126/602 |
| 6,290,185 | B1| * | 9/2001  | DeMars et al.       | 244/173 |

* cited by examiner

*Primary Examiner*—Charles T. Jordan
*Assistant Examiner*—Stephen A. Holzen
(74) *Attorney, Agent, or Firm*—Harness, Dickey & Pierce P.L.C.

(57) ABSTRACT

A non-imaging solar concentrator having a primary concentrator and a turntable. The primary concentrator is mounted to the turntable such that it is rotatable about a turntable axis and a secondary axis that is orthogonal to the turntable axis. Rotation of the primary concentrator about the turntable and secondary axes permits the primary concentrator to be positioned anywhere within the visible sky, even when a solar offset angle of 90 degrees is not used.

17 Claims, 4 Drawing Sheets

ROTATING SOLAR CONCENTRATOR

This invention was made with Government support under contract number F29601-98-C-0031 awarded by the Air Force. The Government has certain rights in this invention.

TECHNICAL FIELD

The present invention relates generally to solar concentrators and more particularly to a solar concentrator that employs a turntable to permit the solar concentrators to be rotated about two orthogonal axes so as to reduce both cost and weight while providing improved performance.

BACKGROUND OF THE INVENTION

BACKGROUND ART

Space-based satellites and solar orbit transfer vehicles frequently collect solar energy with solar concentrators to generate electrical energy and/or propulsive power. It is known in the art to employ imaging concentrators having a single reflective surface for this purpose. The known imaging concentrators typically are of very high optic quality, producing a highly focused beam of energy. These imaging concentrators, however, are relatively heavy and difficult to manufacture. Consequently, their incorporation into a satellite or vehicle platform tends to be costly, consuming both financial and payload capacity.

One alternative to imaging concentrators is a non-imaging concentrator, which employs both a primary concentrator and a secondary concentrator. The primary concentrator collects ambient light and provides a primary light beam that includes a focused portion and an unfocused portion. The secondary concentrator is situated across from the primary concentrator and includes a frusto-conical reflective surface. The secondary concentrator is configured such that the focused portion of primary light beam is transmitted through a hole in the secondary concentrator while the unfocused portion of the primary light beam is reflected back to the primary concentrator. The known non-imaging concentrators are typically lighter in weight, relatively easier to manufacture and less costly than similarly sized imaging concentrators, and as such, there use is more common. Several drawbacks, however, are known to exist.

The known arrangements typically employ a stationary boom having a gimbal mount for supporting the primary concentrator. The gimbal mount between the boom and the primary concentrator permits the primary concentrator to be rotated relative to the secondary concentrator. The gimbal mount, however, is rather costly and heavy.

Another drawback relates to the amount of sky that is visible to the primary concentrator and the type of primary concentrator that is used. Typically, the primary concentrator is constructed with either a 90° solar offset angle or a 70° solar offset angle. The 90° solar offset angle permits 100% of the visible sky to be viewed but is relatively costly. The 70° solar offset angle permits 85% of the visible sky to be viewed but is relatively less expensive.

Accordingly, an improved solar concentrator is needed which is relatively lighter in weight, less expensive, and which permits 100% of the visible sky to be viewed even with a primary concentrator having a 70° solar offset angle.

SUMMARY OF THE INVENTION

In one preferred form, the present invention provides a non-imaging solar concentrator having a primary concentrator, a turntable, a first support structure, a second support structure and a drive mechanism. The primary concentrator is configured to concentrate ambient light into a primary beam. The turntable has a central aperture, which is sized to permit the primary beam to be transmitted therethrough, and a rotatable portion that is rotatable about a turntable axis. The first support structure couples the primary concentrator to a first side of the rotatable portion of the turntable and the second support structure is coupled to a second side of the rotatable portion of the turntable opposite the first side. The secondary concentrator coupled to the second support structure and includes a frusto-conical reflective surface and a beam aperture. The beam aperture is sized to permit a focused portion of the primary beam to be transmitted therethrough, while the frusto-conical reflective surface is configured to reflect an unfocused portion of the primary beam back to the primary concentrator. The drive mechanism is coupled to the rotatable portion of the turntable and is operable for rotating the rotatable portion of the turntable about the turntable axis.

In another preferred form, the present invention provides a method for positioning a non-imaging solar concentrator about a structure having a first axis, the non-imaging solar concentrator having a primary concentrator and a secondary concentrator, the primary concentrator being operable for concentrating ambient light into a primary beam, the secondary concentrator having a frusto-conical reflective surface and a beam aperture, the beam aperture being sized to permit a focused portion of the primary beam to be transmitted therethrough, the frusto-conical reflective surface being configured to reflect an unfocused portion of the primary beam back to the primary concentrator, the method including the steps of: providing a turntable having a rotatable portion and a central aperture formed therethrough, the rotatable portion having a rotational axis, the turntable being coupled to the structure such that the rotational axis is perpendicular to the first axis; coupling the primary solar concentrator to a first side of the rotatable portion of the turntable; coupling the secondary solar concentrator to a second side of the rotatable portion of the turntable; and selectively rotating the primary and secondary concentrators about the turntable axis and the turntable about the first axis to position the non-imaging solar concentrator in a predetermined orientation.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
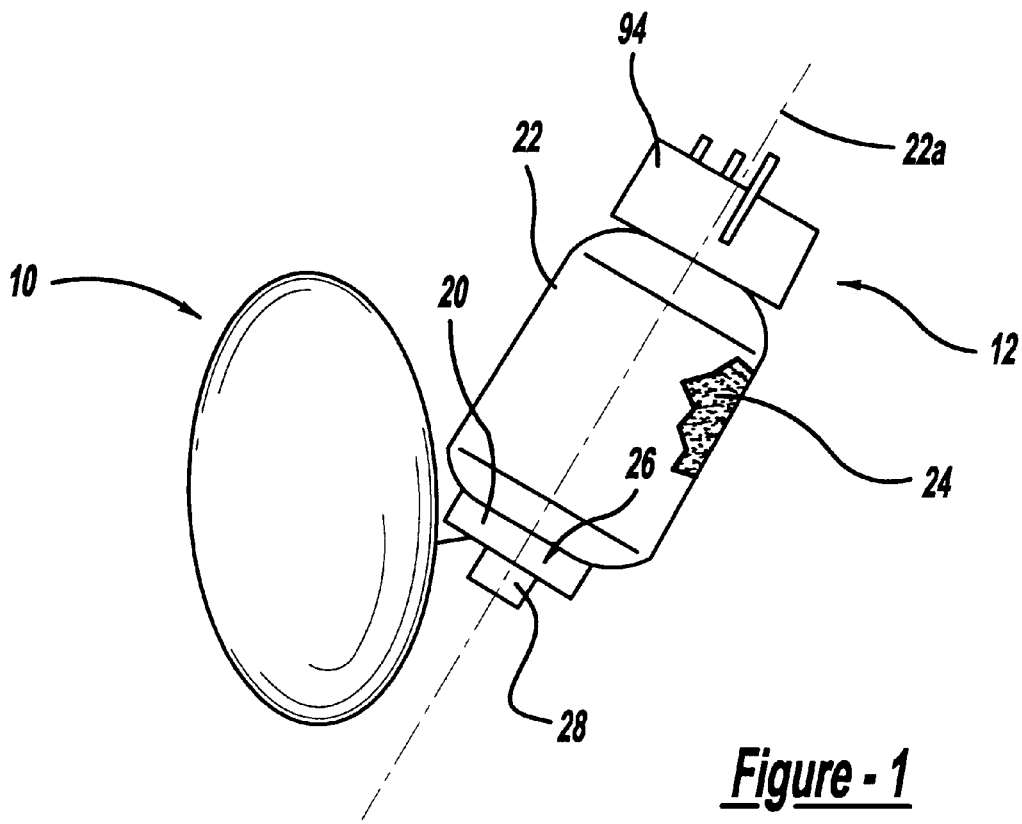
FIG. 1 is a perspective view of a rotating solar concentrator constructed in accordance with the teachings of the present invention and shown in operative association with a solar orbit transfer vehicle having a direct gain solar thermal engine.

With reference to FIG. 1 of the drawings, a non-imaging rotating solar concentrator constructed in accordance with the teachings of the present invention is generally indicated by reference numeral 10. In the particular embodiment illustrated, the solar concentrator 10 is shown in operative association with a solar orbit transfer vehicle 12. Those skilled in the art will understand, however, that the illustration of the rotating solar concentrator 10 in association with the solar orbit transfer vehicle 12 is merely exemplary and not intended to limit the scope of the present invention in any manner. As such, it is contemplated that the rotating solar concentrator 10 may be used in conjunction with other spaced-based devices, such as satellites, for the production of electrical energy and/or propulsive power.

Figure 1A:
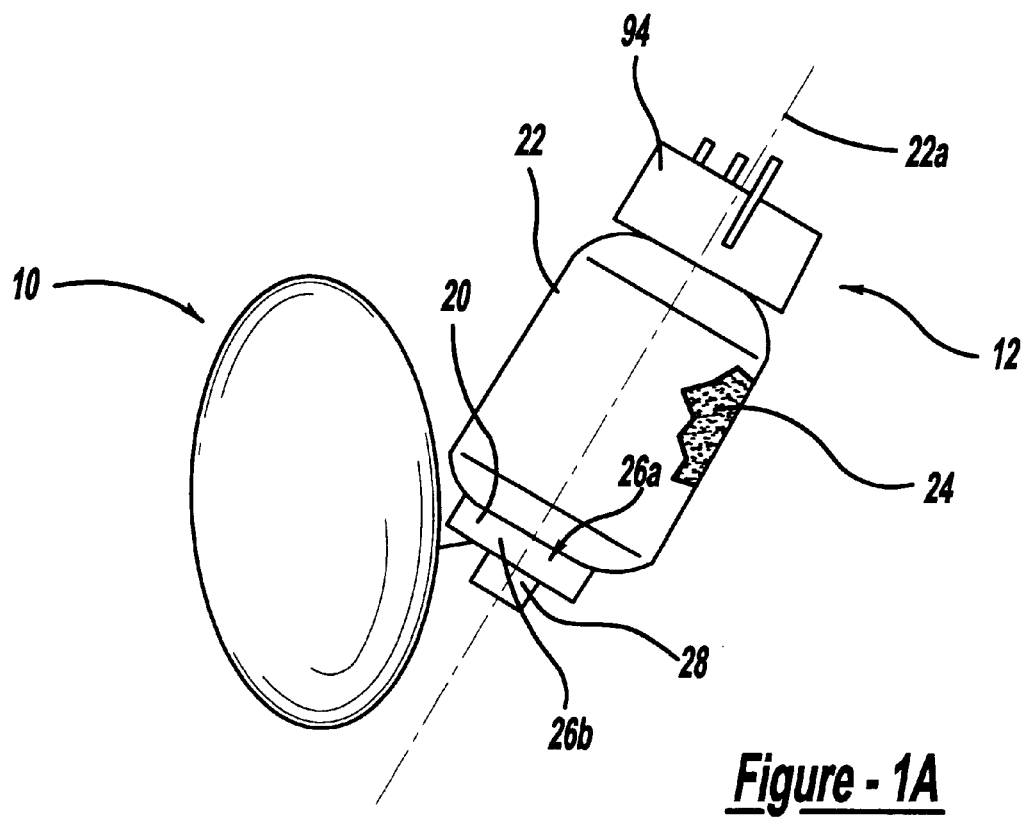
FIG. 1A is a view similar to that of FIG. 1 but illustrating the rotating solar concentrator in operative association with a solar orbit transfer vehicle having a bimodal thermal storage engine.

The solar orbit transfer vehicle 12 is conventional in its construction and operation and as such, need not be discussed in detail. Briefly, the solar orbit transfer vehicle 12 is illustrated to include means for generating electrical energy, such as an array of thermionic converters 20, a propellant tank 22 for storing a propulsive substance 24, such as hydrogen or ammonia, and a direct gain solar thermal engine 26 having at least one propulsion nozzle 28 that is used to propel the solar orbit transfer vehicle 12 in a selected direction. Thermal energy received by the direct gain solar thermal engine 26 is employed to directly heat the propulsive substance 24 to produce a highly energetic vapor that is subsequently expanded in the propulsion nozzle 28 to develop propulsive power. Similarly, thermal energy received by the direct gain solar thermal engine 26 may additionally or alternatively be employed to operate the array of thermionic converters 20 to develop electrical energy. Alternatively, the solar orbit transfer vehicle 12 may include a bimodal thermal storage engine 26a as illustrated in FIG. 1A which stores thermal energy in a receiver-absorber-converter 26b. The receiver-absbrber-converter 26b is selectively controllable to release the thermal energy to heat the propulsive substance 24 and/or the array of thermionic converters 20.

Figure 2:
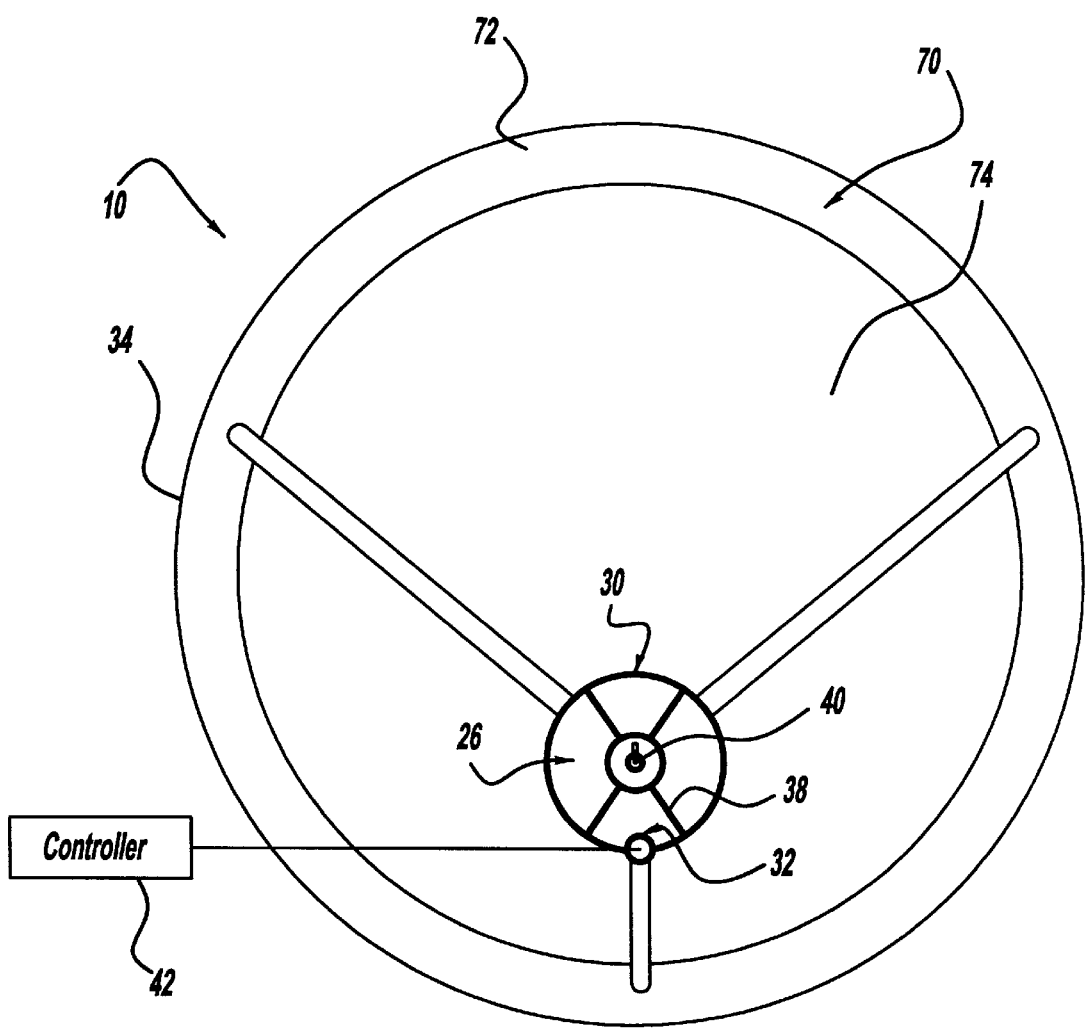
FIG. 2 is an enlarged perspective view of the rotating solar concentrator of FIG. 1.
Figure 3:
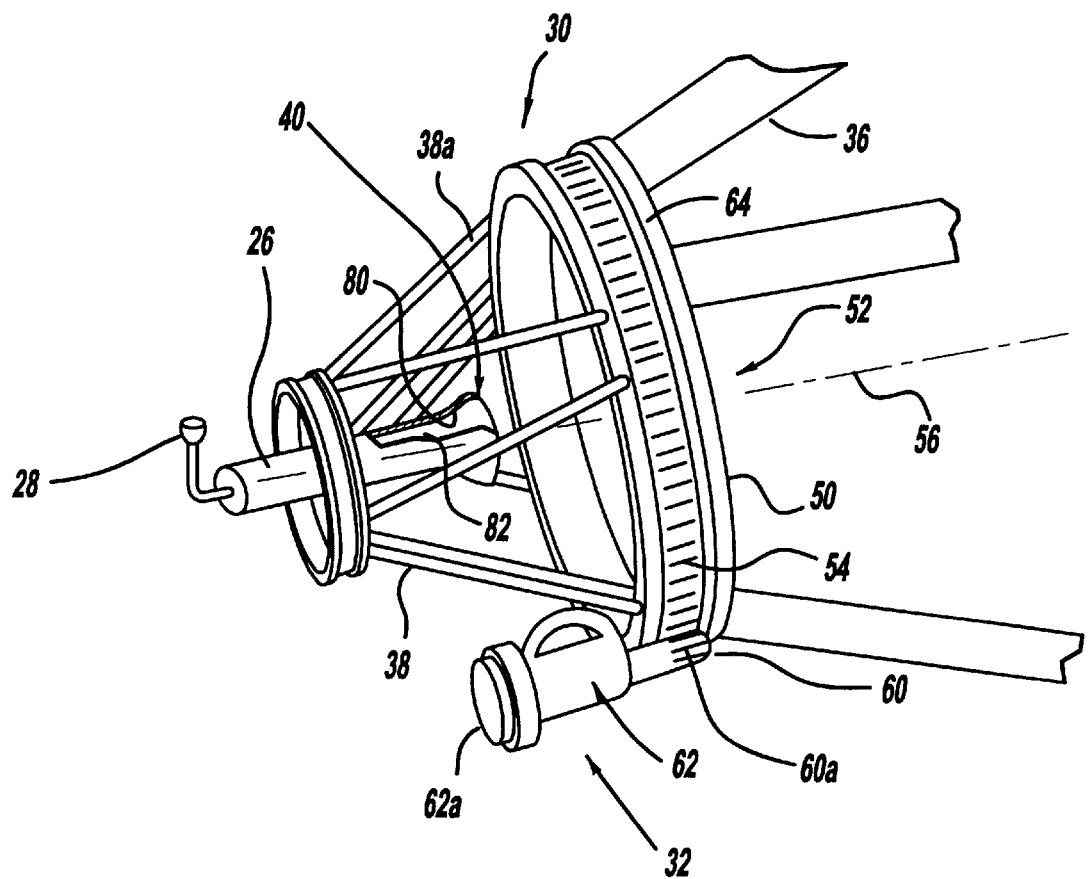
FIG. 3 is an enlarged portion of FIG. 2 illustrating the turntable, the drive mechanism, the secondary concentrator and the direct gain solar thermal engine in greater detail.

With additional reference to FIGS. 2 and 3, the rotating solar concentrator 10 is illustrated to include a turntable 30, a drive mechanism 32, a primary concentrator 34, a first support structure 36, a second support structure 38, a secondary concentrator 40 and a tracking controller 42. The turntable 30 includes a rotating portion 50, a central aperture 52 and, in the particular embodiment illustrated, a nonrotating portion 54 which supports the rotating portion 50 for rotation about a turntable axis 56. The drive mechanism 32 includes a movable portion 60 that is coupled to the rotating portion 50 and a non-movable portion 62 that couples the non-rotating portion 54 and the movable portion 60. In the particular embodiment illustrated, the nonmovable portion 62 includes a drive motor 62a that is fixedly coupled to the non-rotating portion 54 of the turntable 30 and the movable portion 60 includes a gear 60a that is coupled for rotation with an output shaft (not shown) of the drive motor 62a and meshingly engaged with a plurality of gear teeth 64 formed into the perimeter of the rotating portion 50 of the turntable 30. Those skilled in the art will appreciate that any suitable drive mechanism may be utilized, including those employing belts and/or friction rollers. The non-rotating portion 54 of the turntable 30 is fixedly coupled to the propellant tank 22 of the solar orbit transfer vehicle 12 such that the turntable axis 56 is orthogonal to the axis 22a of the propellant tank 22.

The primary concentrator 34 may be a spline radial panel or a Fresnel reflector, but is preferably of an inflatable design, wherein a mounting structure 70 having an inflatable torus 72 is employed to shape and support a reflective member 74. The primary concentrator 34 is illustrated to have a solar offset angle of about 70°, but other solar offset angles may be employed. The first support structure 36 fixedly couples the primary concentrator 34 to the rotating portion 50 of the turntable 30. The first support structure 36 may be formed from rigid materials, or may be of an inflatable design that inflates prior to or concurrently with the inflation of the primary concentrator 34.

Figure 4:
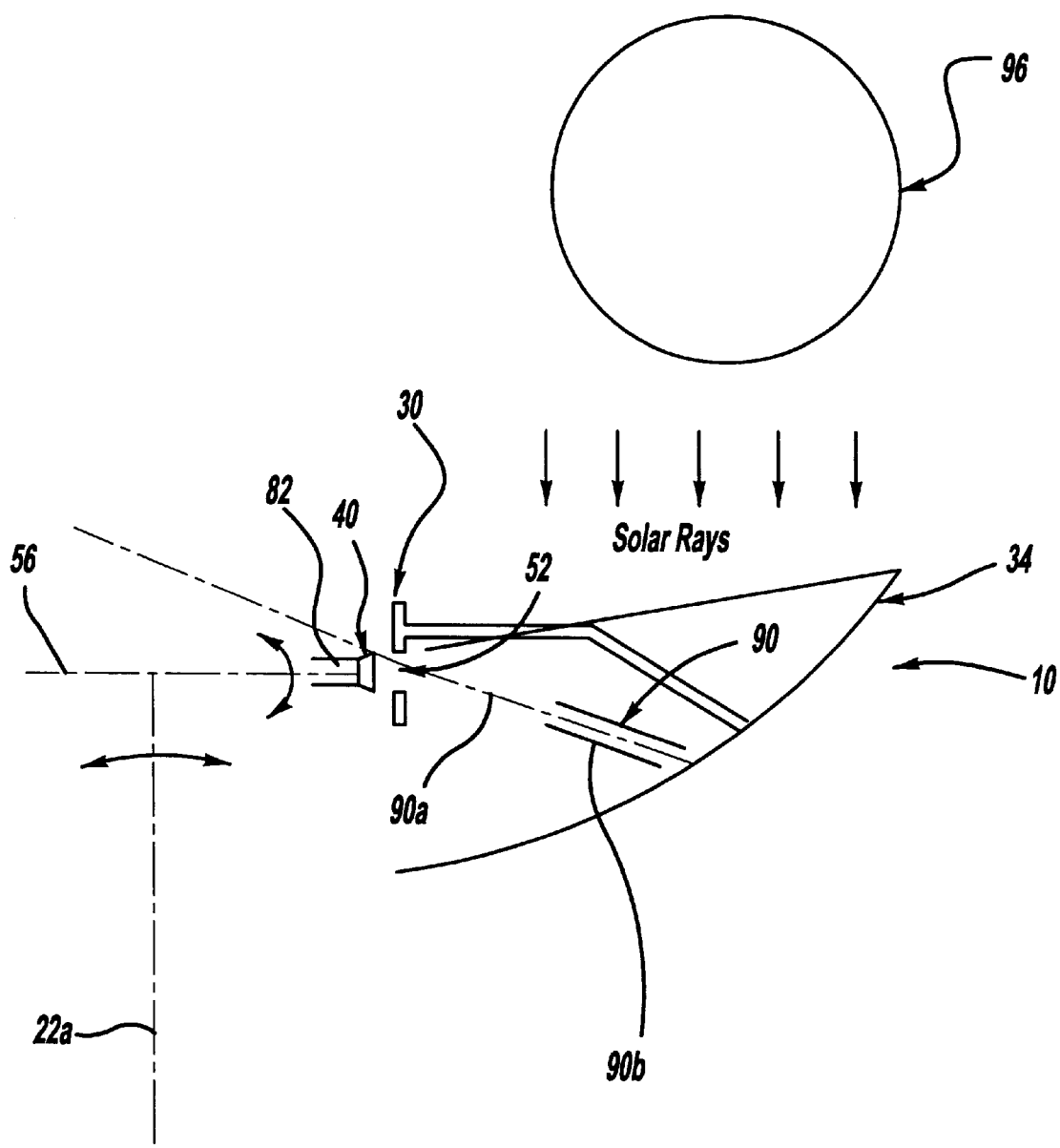
FIG. 4 is a schematic illustration of the rotating solar concentrator.

The second support structure 38 is coupled to a second side of the rotating portion 50 of the turntable 30 opposite the side to which the first support structure 36 is mounted. In the example provided, the second support structure 38 is formed from a network of rigid members 38a and serves as the mount for both the direct gain solar thermal engine 26 and the secondary concentrator 40. The secondary concentrator 40 is coupled to the direct gain solar thermal engine 26 and includes a frusto-conical reflective surface 80 and a beam aperture 82. With additional reference to FIG. 4, during the operation of the solar concentrator 10, the primary concentrator 34 collects ambient light and produces a concentrated beam of light 90 that is transmitted through the central aperture 52 in the turntable 30 and received by the secondary concentrator 40. A focused portion 90a of the beam of light 90 passes through the beam aperture 82 in the secondary concentrator 40 and is received by the direct gain solar thermal engine 26. An unfocused portion 90b of the beam of light 90 is reflected by the frusto-donical reflected surface 80 back to the primary concentrator 34.

The tracking controller 42 is coupled to the solar orbit transfer vehicle 12, the drive mechanism 32 and at least one sensor 94 (FIG. 1) that permits the tracking controller 42 to determine the location of a source of ambient light (i.e., the sun 96). The tracking controller 42 is employed to orient the primary concentrator 34 relative to the source of ambient light so as to produce a desired amount of propulsive power and/or electrical energy. In this regard, the tracking controller 42 orients the primary concentrator 34 relative to the ambient light source by selectively rotating the primary concentrator 34 about the turntable axis 56 (via the drive mechanism 32) and the tank axis 22a (via the at least one propellant nozzle 28). Since the turntable axis 56 and the tank axis 22a are orthogonal to one another, 100% of the visible sky is viewable by the primary concentrator 34.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A non-imaging solar concentrator comprising:

a primary concentrator for concentrating ambient light into a primary beam;

a turntable having a central aperture and a rotatable portion, the rotatable portion being rotatable about a turntable axis, the central aperture being sized to permit the primary beam to be transmitted therethrough;

a first support structure coupling the primary concentrator to a first side of the rotatable portion of the turntable;

a second support structure coupled to a second side of the rotatable portion of the turntable opposite the first side;

a secondary concentrator coupled to the second support structure, the secondary concentrator having a frusto-conical reflective surface and a beam aperture, the beam aperture being sized to permit a focused portion of the primary beam to be transmitted therethrough, the frusto-conical reflective surface being configured to reflect an unfocused portion of the primary beam back to the primary concentrator; and a drive mechanism coupled to the rotatable portion of the turntable and operable for rotating the rotatable portion of the turntable about the turntable axis.

2. The non-imaging solar concentrator of claim 1, wherein the primary concentrator includes a reflective member and an annular support that is fixedly coupled to a perimeter of the reflective member, the annular support being inflatable.

3. The non-imaging solar concentrator of claim 2, wherein the first support structure is inflatable.

4. The non-imaging solar concentrator of claim 1, wherein the primary concentrator includes a reflective member having a solar offset of about 70°.

5. A solar orbit transfer vehicle comprising:

a solar thermal propulsion engine having a propulsion nozzle;

a storage tank coupled to the solar thermal propulsion engine and storing a propulsive substance, the storage tank having a tank axis;

a non-imaging solar concentrator having a primary concentrator, a turntable, a first support structure, a second support structure, a secondary concentrator and a drive mechanism, the primary concentrator being operable for concentrating ambient light into a primary beam, the turntable having a central aperture and a rotatable portion, the rotatable portion being rotatable about a turntable axis, the central aperture being sized to permit the primary beam to be transmitted therethrough, the first support structure coupling the primary concentrator to a first side of the rotatable portion of the turntable, the second support structure operably coupling the storage tank to a second side of the rotatable portion of the turntable opposite the first side, the secondary concentrator being coupled to the second support structure and having a frusto-conical reflective surface and a beam aperture, the beam aperture being sized to permit a focused portion of the primary beam to be transmitted therethrough, the frusto-conical reflective surface being configured to reflect an unfocused portion of the primary beam back to the primary concentrator, the drive mechanism being coupled to the rotatable portion of the turntable and operable for rotating the rotatable portion of the turntable about the turntable axis.

6. The solar orbit transfer vehicle of claim 5, wherein the primary concentrator includes a reflective member and an annular support that is fixedly coupled to a perimeter of the reflective member, the annular support being inflatable.

7. The solar orbit transfer vehicle of claim 6, wherein the first support structure is inflatable.

8. The solar orbit transfer vehicle of claim 5, wherein the primary concentrator includes a reflective member having a solar offset of about 70°.

9. The solar orbit transfer vehicle of claim 5, wherein the propulsive substance is selected from a group consisting of hydrogen and ammonia.

10. The solar orbit transfer vehicle of claim 5, wherein the solar thermal engine is a direct gain solar thermal engine.

11. The solar orbit transfer vehicle of claim 5, wherein the solar thermal engine includes a storage device for selectively discharging thermal energy to heat the propulsive substance.

12. The solar orbit transfer vehicle of claim 5, wherein the tank axis is normal to the rotational axis of the turntable.

13. A method for positioning a non-imaging solar concentrator about a structure having a first axis, the non-imaging solar concentrator having a primary concentrator and a secondary concentrator, the primary concentrator being operable for concentrating ambient light into a primary beam, the secondary concentrator having a frusto-conical reflective surface and a beam aperture, the beam aperture being sized to permit a focused portion of the primary beam to be transmitted therethrough, the frusto-conical reflective surface being configured to reflect an unfocused portion of the primary beam back to the primary concentrator, the method comprising the steps of:

providing a turntable having a rotatable portion and a central aperture formed therethrough, the rotatable portion having a rotational axis, the turntable being coupled to the structure such that the rotational axis is perpendicular to the first axis;

coupling the primary solar concentrator to a first side of the rotatable portion of the turntable;

coupling the secondary solar concentrator to a second side of the rotatable portion of the turntable; and selectively rotating the primary and secondary concentrators about the turntable axis and the turntable about the first axis to position the non-imaging solar concentrator in a predetermined orientation.

14. The method of claim 13, wherein the step of selectively rotating the primary and secondary concentrators about the turntable axis and the turntable about the first axis includes the steps of:

providing a drive mechanism for selectively rotating the rotatable portion of the turntable about the rotational axis; and providing a solar thermal engine having a propulsion nozzle for selectively rotating the turntable about the first axis.

15. The method of claim 14, wherein the solar thermal engine is a direct gain solar thermal engine.

16. The method of claim 14, wherein the solar thermal engine includes a storage device for selectively discharging thermal energy to heat the propulsive substance.

17. The method of claim 13, wherein the primary concentrator includes a reflective member having a solar offset of about 70°.

* * * * *